United States Patent [19]
Klahre

[11] Patent Number: 5,375,988
[45] Date of Patent: Dec. 27, 1994

[54] APPARATUS FOR CONTINUOUS PRODUCTION OF POLYURETHANE BLOCK FOAM

[75] Inventor: Horst Klahre, Sankt Augustin, Germany

[73] Assignee: Maschinenfabrik Hennecke GmbH, Leverkusen, Germany

[21] Appl. No.: 13,920

[22] Filed: Feb. 5, 1993

[30] Foreign Application Priority Data

Feb. 14, 1992 [DE] Germany .................. 4204333

[51] Int. Cl.⁵ .................................. B29C 67/20
[52] U.S. Cl. .................. 425/4 C; 264/45.2; 264/45.8; 264/46.1; 264/46.2; 425/817 C
[58] Field of Search .......... 425/4 R, 4 C, 817 C, 425/375; 264/45.2, 45.8, 46.1, 46.2, 46.3

[56] References Cited

U.S. PATENT DOCUMENTS

| | | | |
|---|---|---|---|
| 3,123,856 | 3/1964 | Dye et al. | 264/46.2 |
| 3,768,937 | 10/1973 | Haga et al. | 425/4 C |
| 3,775,522 | 11/1973 | Auge | 264/46.2 |
| 3,786,122 | 1/1974 | Berg | 425/4 C |
| 3,809,512 | 5/1974 | Blackwell et al. | 425/4 C |
| 3,855,027 | 12/1974 | Erdmann et al. | 264/45.2 |
| 4,060,579 | 11/1977 | Schmitzer et al. | 264/51 |
| 4,102,621 | 7/1978 | Talbert | 425/470 |
| 4,120,626 | 10/1978 | Keller | 425/367 |
| 4,154,562 | 5/1979 | Tabler | 425/817 C |
| 4,255,105 | 3/1981 | Hoffmann et al. | 425/817 C |
| 4,270,889 | 6/1981 | Hoffmann et al. | 425/115 |
| 4,626,183 | 12/1986 | Shirai et al. | 264/46.1 |

FOREIGN PATENT DOCUMENTS

| | | |
|---|---|---|
| 021564 | 1/1981 | European Pat. Off. |
| 3026458 | 2/1982 | Germany |
| 3241520 | 5/1984 | Germany |
| 2004229 | 3/1979 | United Kingdom |
| 7900186 | 4/1979 | WIPO |

OTHER PUBLICATIONS

Plastics Manual, vol. 7, "Polyurethanes", 2nd Edition 1982, p. 95, Carl Hanser Verlag Munich–Vienna.

Primary Examiner—Jay H. Woo
Assistant Examiner—Duane S. Smith
Attorney, Agent, or Firm—Joseph C. Gil

[57] ABSTRACT

In the continuous production of polyurethane block foam, in particular from fast-reacting reaction mixtures which expand with rise time of less than 1.5 minutes, to achieve a good foam quality and a rectangular cross-section a centrally disposed mixer (44) is used, disposed downstream of which is a rubber-elastic plate (22), which is located in the feeding table (21) and in turn has a centrally disposed prop (33), associated with which, at right angles to the production direction and mounted laterally and symmetrically relative to said prop, are at least two adjustable props (32).

8 Claims, 4 Drawing Sheets

FIG. 4-1
FIG. 4-5
FIG. 4-2
FIG. 4-6
FIG. 4-3
FIG. 4-7
FIG. 4-4
FIG. 7
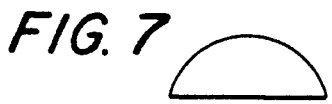
FIG. 8
FIG. 9
FIG. 10
FIG. 11
FIG. 12
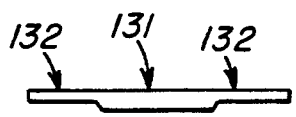
FIG. 13

APPARATUS FOR CONTINUOUS PRODUCTION OF POLYURETHANE BLOCK FOAM

BACKGROUND OF THE INVENTION

The present invention relates to an apparatus for the continuous production of polyurethane block foam, in particular foams from fast-reacting, freely expanding reaction mixtures (having rise times of less than 1.5 minutes). The apparatus broadly comprises a continuous conveyor belt which together with adjustable lateral boundaries forms a width-adjustable expansion trough, a feeding table with a stationary mixing head disposed above it being arranged upstream of the conveyor belt. The feeding table has a distributing device which is disposed downstream of the mixture feeding point and comprises a deformable plate having, disposed below it, a height-adjustable support device, with one or more take-off stations being provided solely for bottom and side wall cover bands.

Continuous block foam production has currently reached a level which satisfies most of the requirements regarding quality and avoidance of waste through a rectangular block cross-section. Only a few special recipes require special measures which are still in need of improvement.

Problems still arise when processing fast-reacting reaction mixtures, e.g. soft, polyester-based foam mixtures, because here the rise time is only about one minute. The rise time is defined as the period from the start of combination of the reaction components up to the end of expansion (Plastics Manual, Vol.7, "Polyurethanes", 2nd Edition 1982, page 95, Carl Hanser Verlag Munich-Vienna). In comparison, the rise time for polyether foams is two to three minutes.

A short rise time requires a very narrow age spectrum of the applied reaction mixture over the expansion width as well as a uniform application height in order to achieve a rectangular block cross-section. The current standard expansion widths of up to 2.50 meters make it particularly difficult to meet said demands. Thus, for example, a uniform mixture application may be achieved by means of a mix head which oscillates over the expansion width but the age spectrum of the reaction mixture is then very disadvantageous. From European patent 21,159, it is known to calibrate the applied reaction mixture by means of a gap. The gap is delimited by the conveyor belt and a cylinder or beam disposed above the belt, with one of the two surfaces which form the gap being deformable from behind by means of adjusting screws so that the height of the gap is adjustable to differing degrees over the expansion width. To prevent the cylinder or beam from becoming soiled with reaction mixture, it is necessary to use not only a bottom, but also a top cover band. The reaction mixture accumulates in front of the cylinder or beam causing an undesirably broad age spectrum. In addition, at a high reaction rate the gases which arise cannot escape in time because of the top cover band and surface defects arise.

According to U.S. Pat. No. 3,123,856, when manufacturing rigid foam blocks, a rectangular block cross-section is achieved by forming, directly next to the lateral boundaries, recesses in the bottom band which are eliminated in the running direction of the conveyor belt. In this case also, the requirement for a reaction mixture age which is as uniform as possible over the expansion width is not met.

PCT WO 79/00186 discloses a width-adjustable block foaming installation having a fixed central part, whose side walls have inwardly displaceable bottom plates which catch under the central part so that the bottom band is applied over the entire expansion width. An oscillating mix head is used, resulting in a disadvantageous age spectrum. The bottom plates do not perform a mixture distributing function.

Finally, it is known (German Auslegeschrift 3,026,458) to dispose an elastic baffle plate below the outlet of a specially designed mixing device. The plate rests on a support with special contours for influencing the mixture distribution. An optimum mixture distribution is however impossible because the baffle plate is disposed above the feeding table and, more particularly, also above the bottom cover band. Since the baffle plate is fastened only in the central region, it is only roughly deformable. There is, in addition, a steep gradient which may lead to curtaining. Although the baffle plate is provided with an anti-adhesive coating, during production breaks the process of rinsing with solvents is unavoidable if the plate is to be kept clean.

The aim of the present invention is therefore to improve the continuous production of polyurethane block foam, in particular from a fast-reacting reaction mixture, i.e. in particular one having a rise time of less than 1.5 minutes, in such a way as to achieve as narrow as possible an age spectrum of the reaction mixture over the application width along with a uniform application height, in order to obtain a homogeneous foam quality with an at least approximately rectangular cross-section.

BRIEF DESCRIPTION OF THE DRAWINGS

FIG. 4 is a sectional view along lines I—I to VII—VII of FIG. 2.

FIGS. 7 to 12 are plan views of variously shaped rubber-elastic plates, and

FIG. 13 is a cross-section through a rubber-elastic plate.

DESCRIPTION OF THE INVENTION

Figure 1:
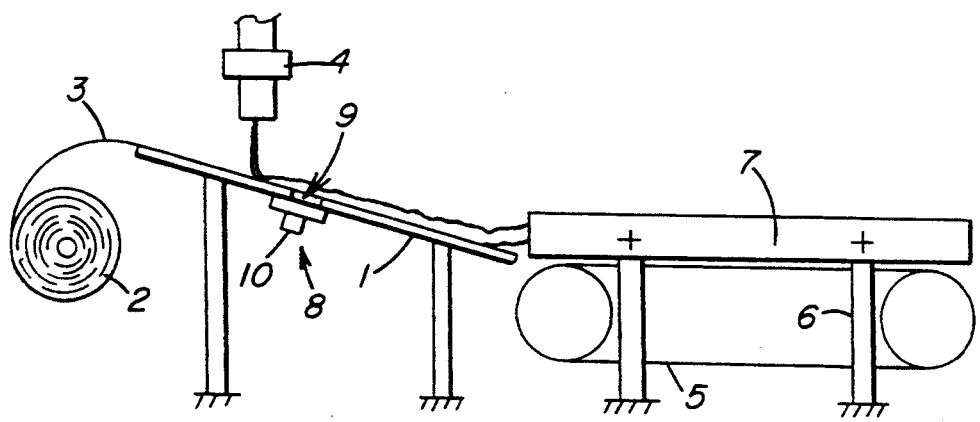
FIG. 1 is a side view of a block foaming apparatus according to the present invention.

The above aim is achieved in that the deformable plate comprises a rubber-elastic plate in the feeding table and extends over at least 80% of the maximum intended application width. In its undeformed state, the plate forms a plane surface with the feeding table. The circumferential edge of the plate is fixed in the feeding table. The support device has a centrally disposed prop, associated with which, at right angles to the production direction and disposed laterally and symmetrically to said prop, are at least two adjustable props.

The effect achieved is that the rubber-elastic plate may be purposefully deformed by the support device and that the deformation may also be adapted to the desired expansion width. The differing adjustability of the individual props allows the mixture emerging at the feeding point from the centrally disposed mix head to be distributed in terms of its flow in such a way as to provide, downstream of the distributing device, in a cross-section over the entire expansion width, a mixture having an extremely narrow age spectrum with a uniform application thickness. The end result is therefore an excellent foam quality and a rectangular block cross-section. It is particularly advantageous that the distributing device is covered by the bottom cover band and does not come into contact with the reaction mixture. It is necessary for the rubber-elastic plate to cover at least 80% of the maximum intended application width so that, upon its deformation, a sufficient gradient arises to distribute the reaction mixture also over the undeformed edge strips. Viewed in production direction, no especially high expansion is required. The expansion should be so tuned that, given maximum height adjustment of the props, the bottom band as it passes over them does not rise too steeply and does not fall back again too steeply. The gradient in particular is a considerable factor influencing the flow rate during mixture distribution. The effect which should be achieved by the flow rate is that, on the one hand, the reaction mixture reaches its final position as far as possible everywhere simultaneously but, on the other hand, during flow, curtaining has to be avoided. How far the maximum height deformation is arranged downstream of the mixture feeding point depends upon the expansion width and the viscosity of the reaction mixture when it leaves the mix head. Depending on whether the props act more towards the front or towards the rear fastening of the rubber-elastic plate, the rise or the fall is steeper. The expansion of the rubber-elastic plate in production direction should be around 0.50 to 1.50 meters. The rubber-elastic plate should have a specific inherent rigidity or be clamped in such a way that, without resting on the support device, it does not sag. The inherent rigidity should, however, allow an adequate degree of deformation. Since the props of the support device are spaced apart from one another in working position, there should be, due to the inherent rigidity of the plate, a smooth transition of the plate between the individual support points. Besides the elasticity of the material of the plate, its thickness also influences deformability. A further parameter for deformability or for the nature of deformability is the manner of fixing the edges of the plate. If fixing is effected at only a few points, the deformability is different than when the fixing points lie close together or when there is all-round clamping. The position of the fixing points allows the deformability also to be adjusted variably in terms of direction so that, in cooperation with the actual position of the supporting props, preferred flow directions may be adjusted.

The lateral props are preferably supported so as to be extendable at right angles to the production direction. The effect thereby achieved is that, when producing blocks of different widths, the mixture distribution may be adapted by means of the props to each width setting. If more than one pair of lateral props is provided, the further pairs of props may be adjustably supported either likewise in the central prop or in one of the inner-lying pairs of props.

According to a further special embodiment, the lateral props are supported so as to be capable of swivelling in production direction. This means that, in addition to being height-adjustable and possibly also laterally extendable, the props may be swivelled about axes in such a way as to be adjustable further in production direction or in the opposite direction thereto. This measure allows the flow directions to be adapted particularly well to the requirements of each reaction mixture and expansion width.

According to a further special embodiment, the lateral props are supported so as to be capable of swivelling at right angles to the production direction. This embodiment is another way of achieving height adjustability.

It is advantageous to support the lateral props so as to be height-adjustable independently of the central prop because a greater range of adjustment is thereby obtained.

For less sophisticated installations, all of the props are supported so as to be jointly height-adjustable, thereby simplifying construction but also limiting the scope of adjustment.

The props normally comprise elements shaped like pistons, the geometric shape of whose support surface naturally likewise influences the nature of deformation of the elastic plate.

According to a further special embodiment, the props have inflatable chambers. Such chambers are known per se. Here, height adjustability may be achieved exclusively or additionally by the degree of inflation.

The rubber-elastic plate preferably has a symmetrical contour. The effect thereby achieved is that the rubber-elastic plate creates the preconditions for a mirror-inverted uniform distribution to both sides of the mixture feeding point disposed in the center of the expansion width.

The geometric shape of the plate in plan view is, in the simplest case, rectangular, possibly with rounded-off corners. By means of an elliptical shape or alternatively a hyperbolic and/or parabolic shape, special distribution effects may be achieved because then, due to the special shapes, it is possible during the support action of the props to achieve particular flow directions. A horizontal projection shaped like a butterfly is particularly suitable.

According to a further special embodiment, the elongation of the rubber-elastic plate differs from point to point. The differing elongation may be achieved when the plate is manufactured by incorporating, for example, rigid inserts at specific points or by varying the thickness of the plate at specific points or by forming ribs on the underside. At the same time, the parameters which have to be specially taken into account are the flowability of the reaction mixture and the expansion width. When these parameters are known, it is possible roughly to calculate in advance the required form of construction. For optimization, however, empirical determination through experiments is advisable.

Several embodiments of the apparatus are illustrated purely diagrammatically in the drawings and are described in greater detail hereinafter.

In FIG. 1, the block foaming apparatus comprises a feeding table 1, with which are associated a take-off station 2 for a bottom and side wall cover band 3 and a mixer 4, which is centrally disposed above the feeding table 1 and is fixed but adjustable in the production direction. The apparatus also includes a continuous conveyor belt 5 disposed downstream of the feeding table 1 and having lateral boundaries 7 supported in the frame 6 so as to be width-adjustable. A distributing device 8 is associated with the feeding table 1. The distributing device comprises a rubber-elastic plate 9, which is located in the feeding table 1 and has a support device 10 disposed below it.

Figure 2:
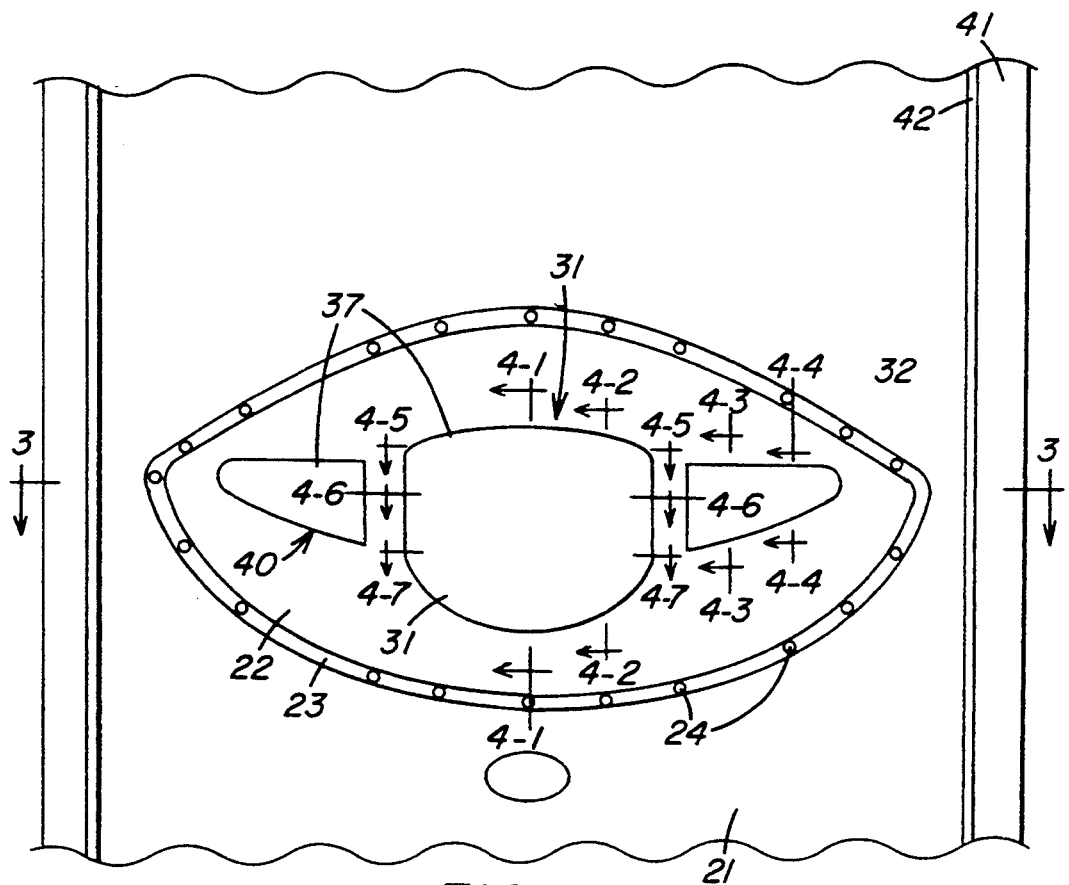
FIG. 2 is a plan view of a design of a feeding table according to a first embodiment.
Figure 3:
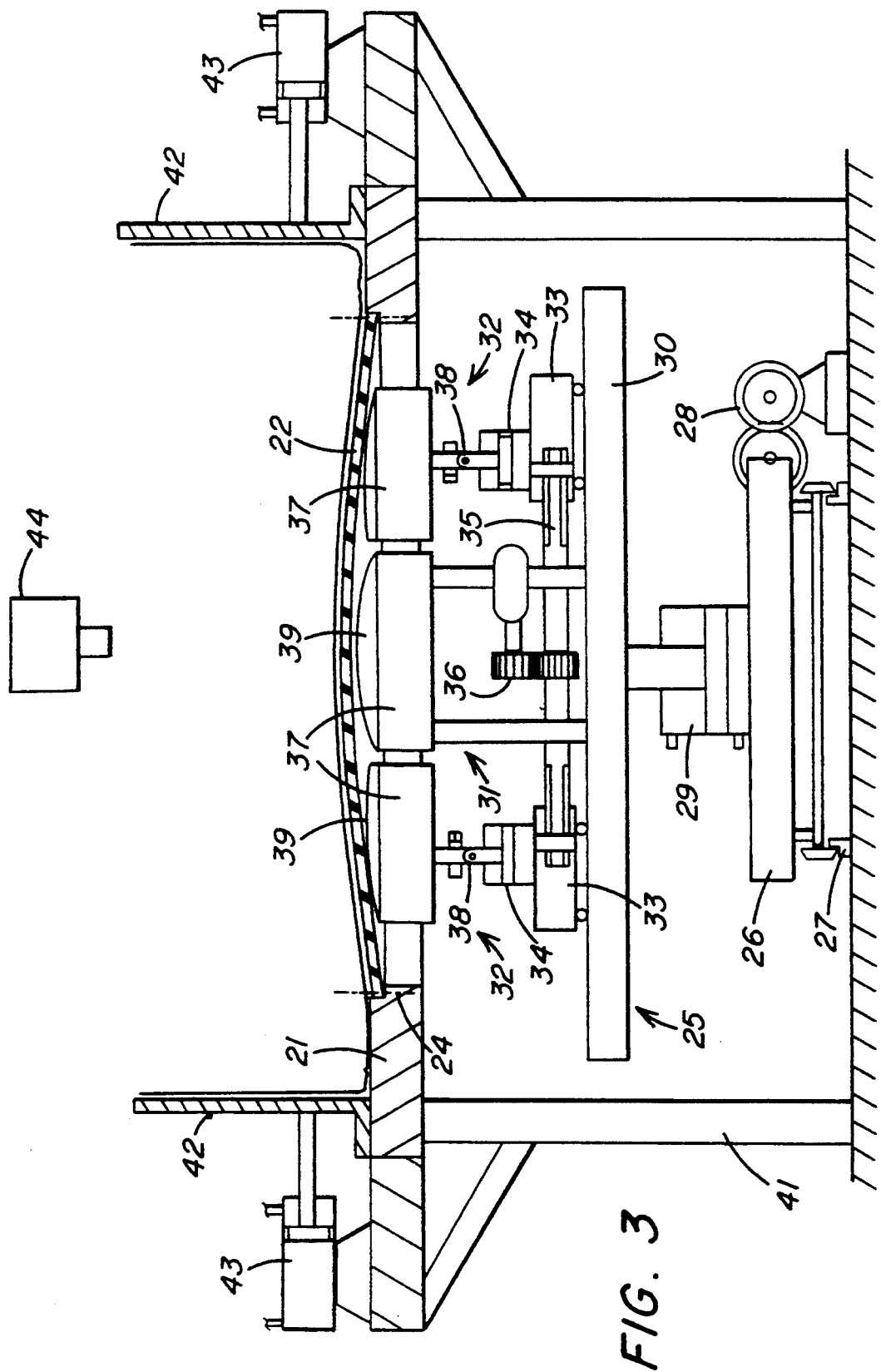
FIG. 3 is a sectional view along line A-B of FIG. 2.

In FIGS. 2 to 4, a rubber-elastic plate 22 is located in the feeding table 21 and is fastened to a shouldered edge 23 by means of screws 24, the screws 24 being at preselected differing distances from one another in order to achieve preferred directions of elongation. The plate 22 extends over 85% of the maximum expansion width and is mirror-symmetrical relative to the longitudinal axis of the feeding table 1. Disposed below the rubber-elastic plate 22 is a support device 25, which is supported so as to be movable in the production direction. A carriage 26 is provided, which travels along rails 27 and is adjustable by means of a drive 28. The carriage 26 may be fixed in its desired position by means of fixing elements (not shown). Disposed on the carriage 26 is a piston/cylinder unit 29, which supports a height-adjustable supporting plate 30. Supported on the supporting plate 30 is a central prop 31, with which two further props 32 are associated laterally and in a mirror-inverted manner. The props 32 are supported on a carriage 33 by means of piston/cylinder units 34, with the carriages 33 being transversely movable by means of a spindle 35 and a drive 36. The carriages are adjustable in the desired position. The actual prop heads 37 are connected via clampable universal joints 38 to the piston/cylinder units 34 so that the lateral prop heads 37 may swivel both transversely and in the production direction. For the swivelling action, it is conceivable for piston/cylinder units (not shown) to be provided instead of the clamping elements of the universal joints 38, this naturally entailing a much higher outlay but also enabling adjustability during production. The end faces 39 of the prop heads 37 are convex and present, in plan view, suitable geometric peripheral contours 40. The working table 21 is supported on the frame 41, on which the lateral boundaries 42 are also supported by means of the piston/cylinder units 43 which enable adjustability of the expansion width. Because of the multiple adjustability of the support device, namely in height, width and in the production direction, it is possible to arch the rubber-elastic plate 22 upwards in an optimum manner at the desired points so as to create optimum flow conditions depending upon the mixture feed quantity and the viscosity of the mixture so that downstream of the distributing device, viewed transversely over the expansion width, there is a reaction mixture of virtually uniform age. The mixer 44, which is disposed centrally relative to the expansion width, is displaceable in the production direction, thereby also allowing the distance of the mixture feeding point from the support device 25 to be preselected. The piston/cylinder units 29, 34, 43 are connected by lines to a hydraulic control system, which is in turn operable from a control console, possibly according to a preset program.

The end face geometry of the prop heads 37 may be seen from the various sections of FIG. 4.

Figure 5:
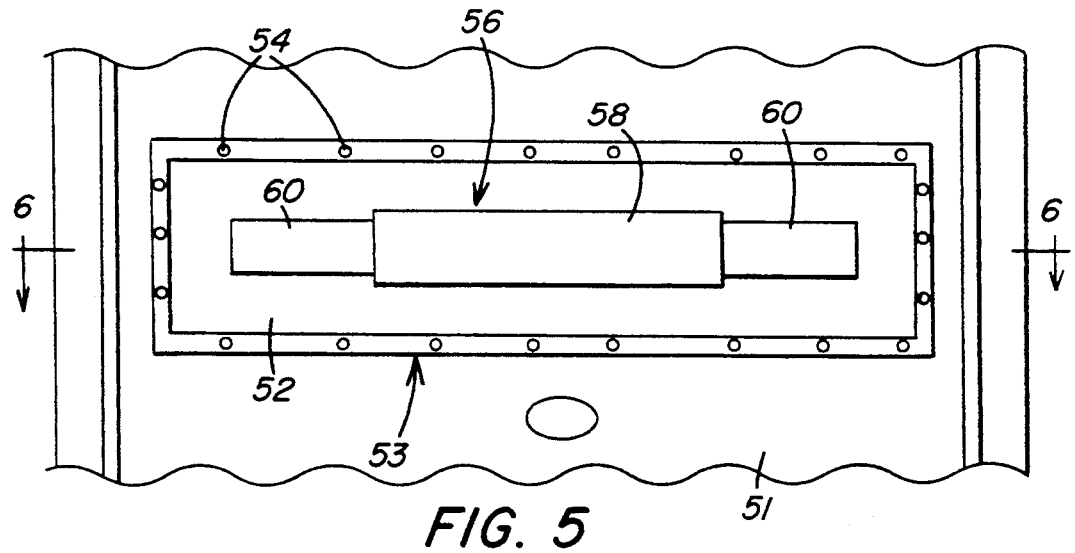
FIG. 5 is a plan view of a design of a feeding table according to a second embodiment.
Figure 6:
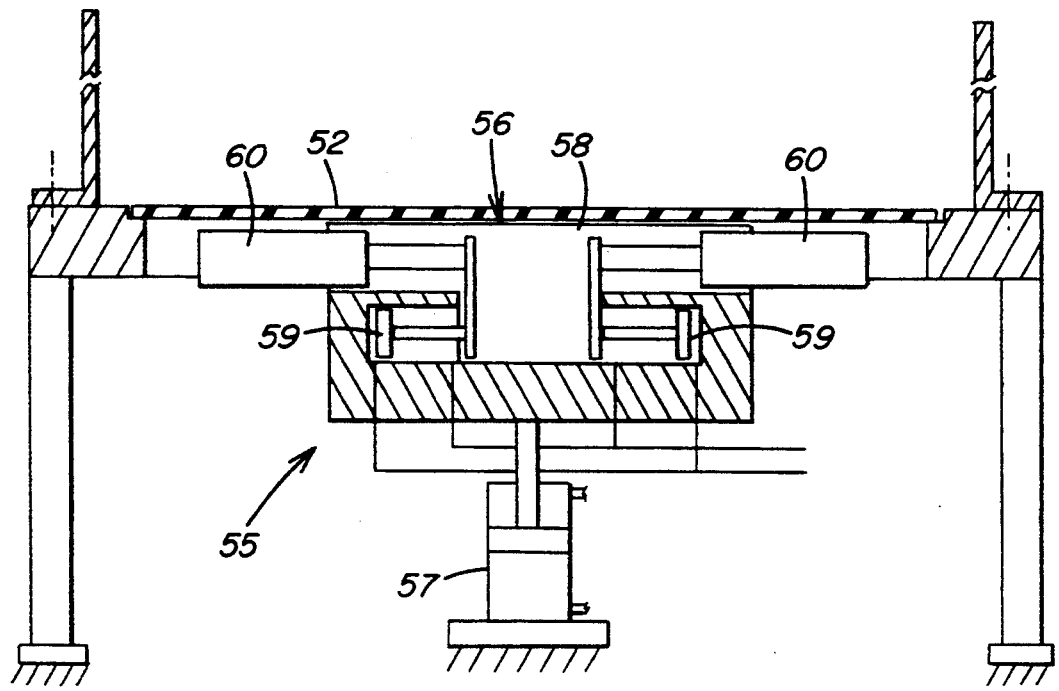
FIG. 6 is a sectional view along line C-D of FIG. 5.

FIGS. 5 and 6 illustrate a substantially simplified embodiment. Here, a rectangular rubber-elastic plate 52 is set in the feeding table 51 and is fastened to a shouldered edge 53 by means of screws 54, the screws 54 being at preselected differing distances from one another in order to achieve preferred elongation directions. Here too, the rubber-elastic plate 52 extends over 85% of the maximum expansion width. The support device 55 disposed below the plate 52 is of a very simple construction. A central prop 56 is disposed on a piston/cylinder unit 57 so as to be height-adjustable. The prop 56 is hollow and beam-like and its actual prop head comprises a cover plate 58. Disposed in the cavity of the prop 56 are two piston/cylinder units 59, which operate in opposite directions and may displace props 60 at right angles to the production direction. The cover plate 58 may also be constructed so as to provide a gap, in which the props 60 with a circular cross-section extend far enough for their top surface line to lie flush with the surface of the cover plate 58.

FIGS. 7 to 12 show special horizontal projection contours of the rubber-elastic plate, on the basis of which, in conjunction with the action of the props, the desired distribution of the reaction mixture over the expansion width is achieved. Depending on the discharge quantity and viscosity of the mixture—with the angle of inclination of the feeding table and the production rate also being a factor—one or the other form of construction will be selected. Of course, only some of many possible forms of construction are demonstrated here. With the forms of construction according to FIGS. 7 and 9, distribution is mainly towards the center, whereas with the forms of construction according to FIGS. 8 and 10 the reaction mixture is distributed mainly towards the sides. With the forms of construction according to FIGS. 11 and 12, there are created, in cooperation with the corresponding three props, in the region between the props valleys through which more mixture flows.

FIG. 11 further reveals reinforcing ribs 111 (shown by dashes) situated on the underside of the plate and effecting differing deformation of the plate.

It is evident from FIG. 13 that the rubber-elastic plate can have zones 131 and 132 of differing thickness.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for continuous production of polyurethane block foam comprising:
   a) a continuous conveyor belt which together with adjustable lateral boundaries forms a width-adjustable expansion trough,
   b) a feeding table with a stationary mix head disposed above it, said table being arranged upstream of the conveyor belt, said feeding table having a distributing device, said distributing device being located downstream of the mix head and upstream of the conveyor belt,
   c) said distributing device comprising a deformable plate having disposed below it, a height-adjustable support device,
   d) one or more take-off stations located upstream of said mixhead for positioning bottom and side wall cover bands over said feeding table and under said mixhead,
   e) said deformable plate comprising a rubber-elastic plate in the feeding table and extending over at least 80% of the maximum intended application width, with said plate forming in its undeformed state, a plane surface with the feeding table, with the circumferential edge of said plate being fixed in the feeding table,
   f) said height-adjustable support device having a centrally disposed prop, associated with which, at right angles to the production direction and disposed laterally and symmetrically to said prop, are at least two adjustable lateral props.

2. The apparatus of claim 1, wherein said lateral props are supported so as to be movable at right angles to the production direction.

3. The apparatus of claim 1, wherein said lateral props are supported so as to be capable of swivelling.

4. The apparatus of claim 1, wherein said the lateral props are supported so as to be height-adjustable independently of the centrally disposed prop.

5. The apparatus of claim 1, wherein all of said props are supported so as to be jointly height-adjustable.

6. The apparatus of claim 1, wherein said props comprise inflatable chambers.

7. The apparatus of claim 1, wherein said rubber-elastic plate is contoured symmetrically relative to the production axis.

8. The apparatus of claim 1, wherein the elongation of said rubber-elastic plate varies from point to point.

* * * * *